(12) United States Patent
Bottomley et al.

(10) Patent No.: US 7,536,158 B2
(45) Date of Patent: May 19, 2009

(54) IMPAIRMENT CORRELATION ESTIMATION IN A SPREAD SPECTRUM SYSTEM

(75) Inventors: Gregory E. Bottomley, Cary, NC (US); Ali S. Khayrallah, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 782 days.

(21) Appl. No.: 10/811,699

(22) Filed: Mar. 29, 2004

(65) Prior Publication Data

US 2005/0215218 A1 Sep. 29, 2005

(51) Int. Cl.
H04B 17/02 (2006.01)

(52) U.S. Cl. ............. 455/135; 455/226.3; 455/277.2; 375/150

(58) Field of Classification Search ............ 455/136, 455/137, 269, 273, 276, 278, 296, 67.11, 455/67.13, 132–135, 225, 226.1–226.3, 272, 455/277.1, 277.2, 276.1; 375/148, 150, 147
See application file for complete search history.

(56) References Cited

U.S. PATENT DOCUMENTS

| | | | |
|---|---|---|---|
| 5,572,552 A | 11/1996 | Dent et al. | |
| 5,983,105 A | 11/1999 | Stahle | |
| 6,026,115 A | 2/2000 | Higashi et al. | |
| 6,363,104 B1 | 3/2002 | Bottomley | |
| 6,470,044 B1 | 10/2002 | Kowalski | |
| 6,553,074 B1* | 4/2003 | Shalvi et al. ............ | 375/242 |
| 6,683,924 B1 | 1/2004 | Ottosson et al. | |
| 6,990,137 B2* | 1/2006 | Smee et al. ............ | 375/142 |
| 2001/0028677 A1 | 10/2001 | Wang et al. | |
| 2002/0051485 A1 | 5/2002 | Bottomley | |
| 2002/0122470 A1 | 9/2002 | Heikkila | |
| 2004/0028013 A1* | 2/2004 | Fitton et al. ............ | 370/335 |
| 2004/0264417 A1* | 12/2004 | Heikkila et al. ............ | 370/335 |
| 2005/0069023 A1* | 3/2005 | Bottomley et al. ............ | 375/148 |

(Continued)

FOREIGN PATENT DOCUMENTS

EP 1 289 162 3/2003

(Continued)

OTHER PUBLICATIONS

Tantikovit et al., "A Unified View of RAKE Reception and Its Application on Receiver Designs for Multimedia Capable Mobile Terminals in W-CDMA," IEICE Trans. Commun., Oct. 2002, pp. 1944-1956, vol. E85-B, No. 10.

(Continued)

*Primary Examiner*—Nhan T Le
(74) *Attorney, Agent, or Firm*—Coats & Bennett, P.L.L.C.

(57) ABSTRACT

A method and apparatus derives an impairment correlation matrix to process signals received at a wireless receiver over multiple paths of a multi-path channel. The receiver includes first and second impairment correlation estimators for estimating first and second impairment correlation matrices based on despread symbols received over multiple paths of a multi-path channel. The receiver then derives the impairment correlation matrix based on the estimated first and second impairment correlation matrices. The receiver may combine traffic despread values to suppress interference using weighting factors calculated based on the derived impairment correlation matrix. Further, the receiver may estimate a signal-to-interference ratio based on the derived impairment correlation matrix.

60 Claims, 10 Drawing Sheets

U.S. PATENT DOCUMENTS

| | | | |
|---|---|---|---|
| 2005/0078742 A1* | 4/2005 | Cairns et al. | 375/148 |
| 2005/0195889 A1* | 9/2005 | Grant et al. | 375/148 |
| 2006/0133456 A1* | 6/2006 | Ettorre et al. | 375/148 |

FOREIGN PATENT DOCUMENTS

| | | |
|---|---|---|
| EP | 1392000 A1 | 2/2004 |
| WO | WO 99/65153 | 12/1999 |
| WO | WO 01/01594 A1 | 1/2001 |
| WO | WO 01/01595 | 4/2001 |
| WO | WO 01/71927 | 9/2001 |

OTHER PUBLICATIONS

U.S. Appl. No. 10/869,456, filed Jun. 16, 2004; Bottomley, et al.; SIR Estimation in a Wireless Receiver; 47 pgs.

R. McDonough and A. Whalen, Detection of Signals in Noise, Second Edition, Academic Press.

G. Bottomley, T. Ottosson, and Y. Wang, "A Generalized RAKE Receiver for Interference Suppression," *IEEE Journal on Selected Areas in Communications*, vol. 18, No. 8, Aug. 2000, pp. 1536-1545.

H. Liu and M. Zoltowski, "Blind Equalization in Antenna Array CDMA Systems," *IEEE Transactions on Signal Processing*, vol. 45, No. 1, Jan. 1997, pp. 161-172.

J. Choi, "Pilot Channel-Aided Techniques to Compute the Beamforming Vector for CDMA Systems with Antenna Array," *IEEE Transactions on Vehicular Technology*, vol. 49, No. 5, Sep. 2000, pp. 1760-1775.

I.S. Reed, J.D. Mallet, and L.E. Brennan, "Rapid Convergence Rate in Adaptive Arrays," *IEEE Transactions on Aerospace and Electronic Systems*, vol. AES-10, No. 6, Nov. 1974, pp. 853-863.

Co-pending U.S. Appl. No. 11/566,820, filed Dec. 5, 2006.

Co-pending U.S. Appl. No. 11/935,840, filed Nov. 7, 2007.

C.G. Khatri and C. Radhakrishna, "Effects of Estimated Noise Covariance Matrix in Optimal Signal Detection," *IEEE Transactions on Acoustics, Speech, and Signal Processing*, vol. ASSP-35, No. 5, May 1987, pp. 671-679.

B. Suard, A. Naguib, G. Xu and A. Paulraj, "Performance of CDMA Mobile Communication Systems Using Antenna Arrays," *Proc. IEEE Intl. Conf. Acoust.,, Speech, & Signal Proc. (ICASSP)*, Minneapolis, MN, Apr. 27-30, 1993, pp. IV-153 to IV-156.

G. Kutz and A. Chass, "On the Performance of a Practical Downlink CDMA Generalized RAKE Receiver," IEEE VTC 2002 Fall, Vancouver Sep. 24-28.

G. Kutz and A. Chass, "Low Complexity Implementation of a Downlink CDMA Generalized RAKE Receiver," IEEE VTC 2002 Fall, Vancouver Sep. 24-28.

Y. Wang and G. Bottomley, "Generalized RAKE Reception for Cancelling Interference from Multiple Base Stations," IEEE VTC 2000.

Petre et al, "Pilot-aided Adaptive Chip Equalizer Receiver for Interference Suppression in DS-CDMA Forward Link," Vehicular Technology Conference Fall 2000, Sep. 24-28, 2000, 2.4.2.2.

Wang, Y.-P. Eric and Bottomley, Gregory E. "CDMA Downlink System Capacity Enhancement through Generalized RAKE Reception," in Proc. IEEE Veh. Technol. Conf., Atlantic City, NJ, Oct. 7-11, 2001.

Chowdhury, S., and Zoltowski, M.D., "Combined MMSE equality and multiuser detection for high-speed CDMA forward link with sparse multipath channels," Conference Record of Thirty-Fifth Asilomar Conference on Signals, Systems and Computers, Nov. 4-7, 2001, vol. 1, (Abstract).

Hai, Wang, Ramesh, R., Bottomley, Gregory E., and Wang, Y.-P Eric, "Approaches for fast, adaptive, generalized rake reception," Research Disclosure Journal, 475041, Nov. 2003, Kenneth Mason Publ. Ltd.

\* cited by examiner

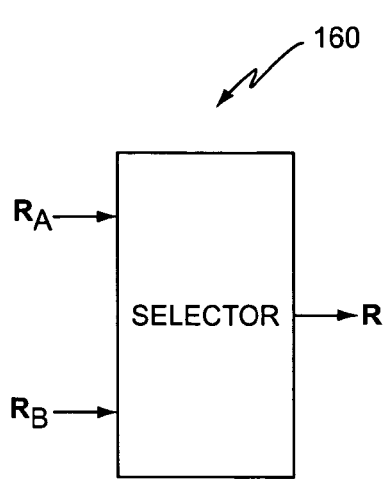
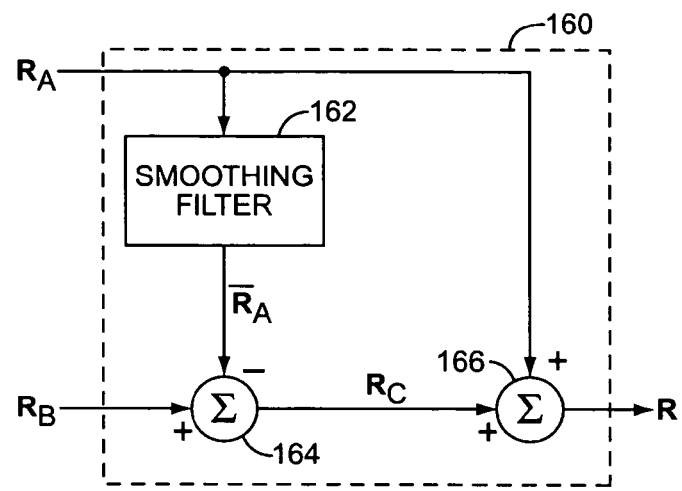
*FIG. 8A*  *FIG. 8B*
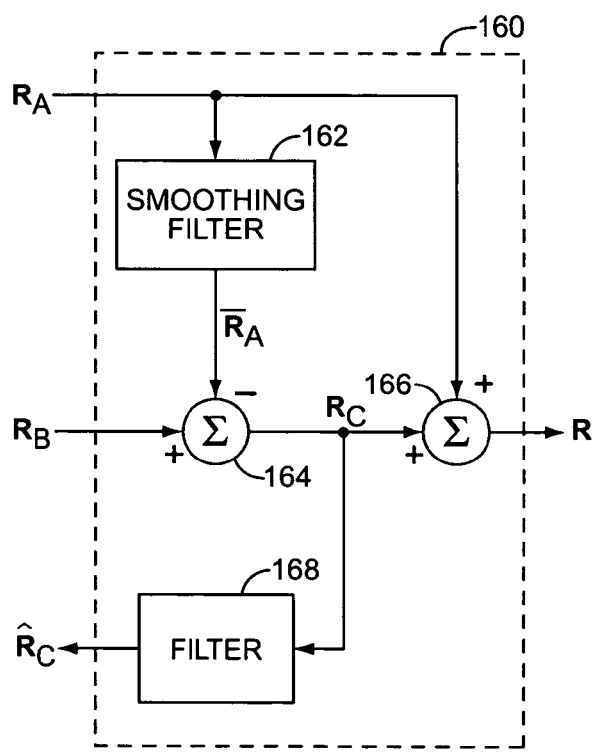
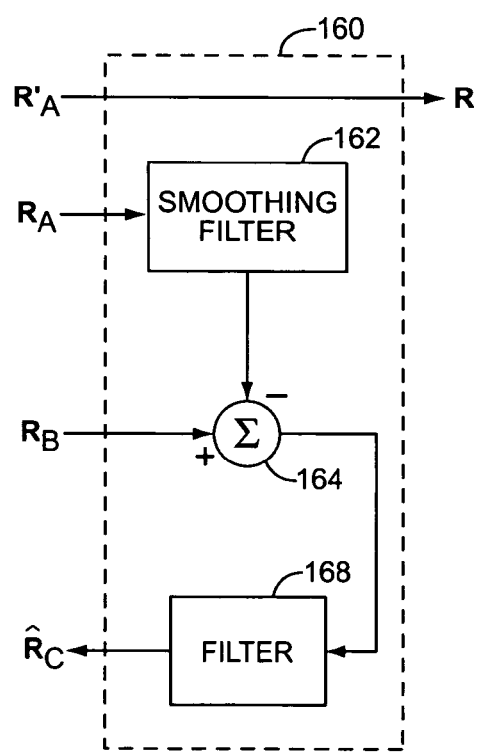
*FIG. 8C*  *FIG. 8D*

IMPAIRMENT CORRELATION ESTIMATION IN A SPREAD SPECTRUM SYSTEM

BACKGROUND OF THE INVENTION

The present invention relates generally to signal processing parameters for processing received signals in a wireless communication system, and more particularly to estimating signal impairment correlations of multiple images of the received signals.

Wireless receivers in spread spectrum systems, such as code division multiple access (CDMA) systems, are well known in the communication arts. Typically, wireless receivers operating in a spread spectrum system include a RAKE receiver, which is responsible for demodulating multiple signal images of a received multi-path signal. In general, a RAKE receiver in a base station or a mobile station receives a desired signal in the presence of other interfering signals intended for or sent from other base stations and/or mobile stations. By using calculated weighting factors to coherently combine correlated symbols corresponding to the desired received signal, the RAKE receiver uses multi-path reception to improve the signal-to-noise ratio (SNR) of the received multi-path signal.

While conventional RAKE receivers are effective at reducing channel path noise, receiver noise, etc., and therefore, are effective at improving the SNR of received multi-path signals, conventional RAKE receivers are typically ineffective against interference noise caused by self-interference, multi-user access interference, etc. To address noise and interference, a generalized RAKE (G-RAKE) receiver may be used instead of the conventional RAKE receiver, as discussed in co-assigned U.S. Pat. No. 6,363,104 to Bottomley entitled "Method and Apparatus for Interference Cancellation in a RAKE Receiver," issued 26 Mar. 2002. This patent is incorporated herein by reference. Like a RAKE receiver, a G-RAKE receiver correlates received signal images, weights the correlated signal images using weighting factors, and coherently combines the weighted signal images. However, unlike the RAKE receiver, the weighting factors of the G-RAKE are based on estimated impairment correlations. To suppress noise and interference, the G-RAKE combiner uses impairment correlation based weighting factors to weight the correlated signal images and to coherently combine the weighted images. As discussed further below, the success of the interference suppression in a G-RAKE receiver is dependent on the accurate estimation of these impairment correlations.

SUMMARY OF THE INVENTION

The present invention comprises a method and apparatus for deriving an impairment correlation matrix to process signals received at a wireless receiver over multiple paths of a multi-path channel. The receiver despreads symbols of the received signals and determines channel estimates from the despread symbols. First and second impairment correlation estimators estimate first and second impairment correlation matrices based on the despread symbols. Based on the first and second impairment correlation matrices, a correlation processor derives the impairment correlation matrix.

The receiver may use the derived impairment correlation matrix to generate one or more processing parameters for processing the received signals. In one embodiment, a weight calculator calculates weighting factors based on the derived impairment correlation matrix. The calculated weighting factors are then used to coherently combine the despread symbols to suppress noise and interference in the received signal. In another embodiment, a signal-to-interference ratio (SIR) calculator calculates an SIR estimate based on the derived impairment correlation matrix. The estimated SIR may be used for rate adaptation or as part of the transmit power control for the base station or mobile station.

BRIEF DESCRIPTION OF THE DRAWINGS

FIGS. 8A-8D illustrate exemplary correlation processors for the impairment correlation estimators of FIGS. 5A and 5B.

DETAILED DESCRIPTION OF THE INVENTION

Figure 1:
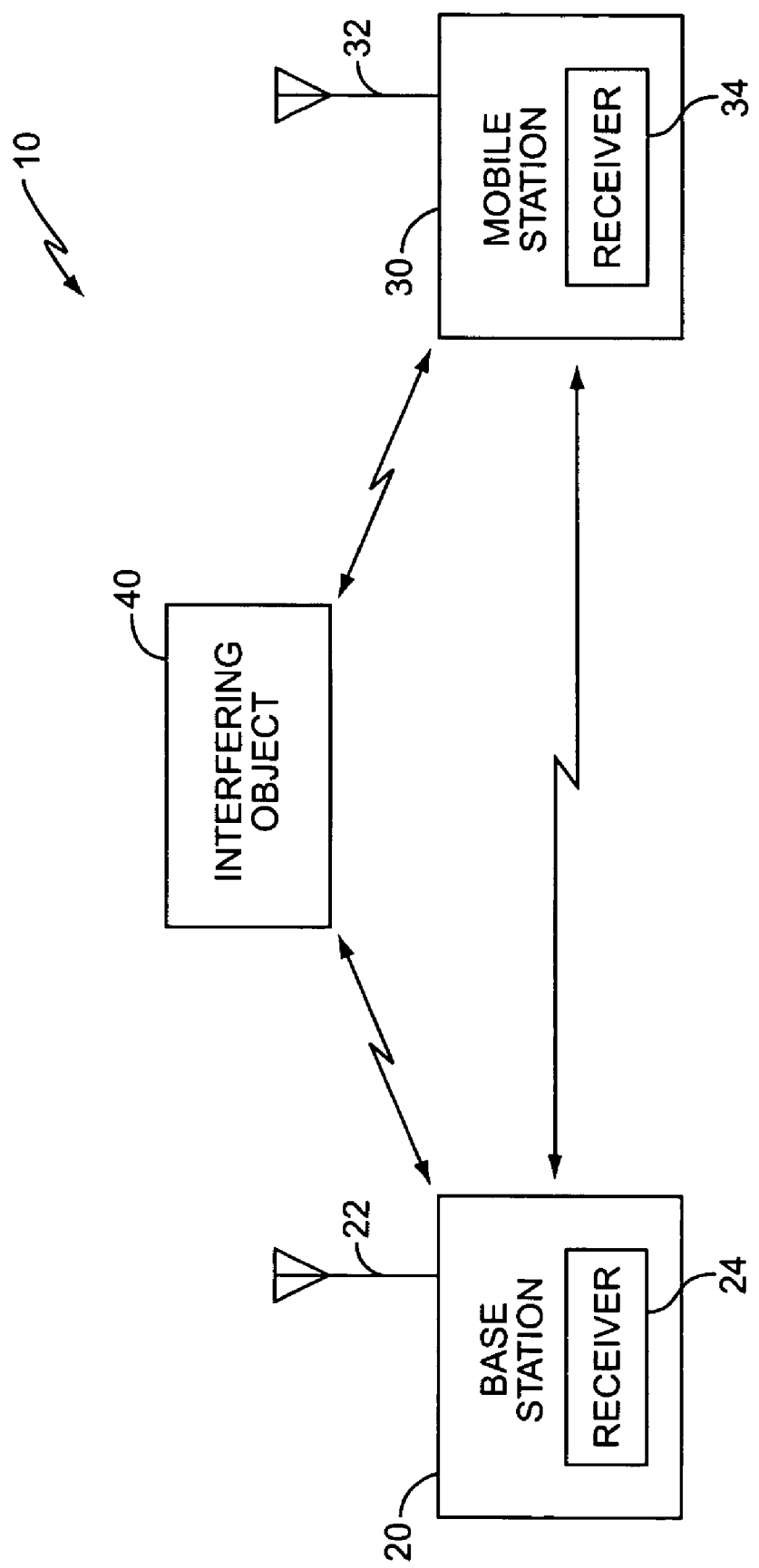
FIG. 1 illustrates an exemplary multi-path wireless communication system.

FIG. 1 illustrates an exemplary spread spectrum wireless communication system 10. The wireless communication system 10 includes at least one base station 20, at least one mobile station 30, and possibly one or more interfering objects 40. As used herein, the term "mobile station" may include a cellular radiotelephone with or without a multi-line display; a Personal Communications System (PCS) terminal that may combine a cellular radiotelephone with data processing, facsimile and data communications capabilities; a personal data assistant (PDA) that can include a radiotelephone, pager, Internet/intranet access, Web browser, organizer, calendar, and/or a global positioning system (GPS) receiver; and a conventional laptop and/or palmtop receiver or other appliance that includes a radiotelephone transceiver. Mobile stations may also be referred to as "pervasive computing" devices.

Base station 20 includes one or more antennas 22 for transmitting/receiving spread spectrum signals with one or more symbols to/from mobile station 30. The transmitted signals typically include traffic and pilot signals. Objects, such as interfering object 40, cause multiple echoes of the transmitted symbols to arrive at mobile station 30 at different times. Receiver 34 processes the multiple signal images at mobile station 30. Similarly, mobile station 30 may transmit symbols via one or more antennas 32 along multiple paths to base station 20, where receiver 24 processes the multiple received symbol images.

Figure 2:
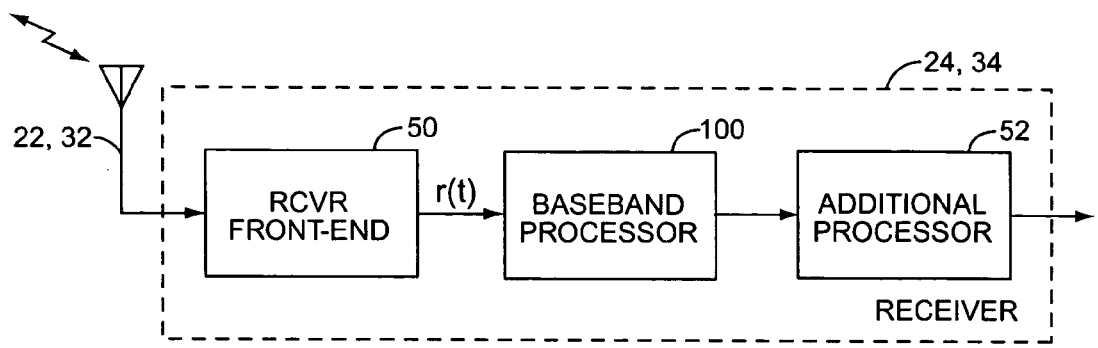
FIG. 2 illustrates an exemplary wireless communication system receiver.

FIG. 2 illustrates an exemplary receiver 24, 34 for base station 20 and/or mobile station 30. The receiver 24, 34 receives and processes the symbols of the received signals to generate received symbol estimates. An exemplary receiver 24, 34 includes a front end 50, a baseband processor 100, and an additional processor 52. Front end 50 typically includes filters and/or mixers to convert the received signals to baseband signals, and conversion circuits, such as analog-to-digital converters, to produce a series of digitized baseband signal samples r(t) corresponding to the baseband signal. Baseband processor 100 demodulates the baseband signal samples r(t) to produce symbol estimates corresponding to the received signal. These symbol estimates are then processed further, as necessary, in additional processor 52. For example, additional processor 52 may include a turbo decoder (not shown) that determines information bit values based on the symbol estimates provided by the baseband processor 100. These information bit values may then be converted to speech, images, etc.

Figure 3:
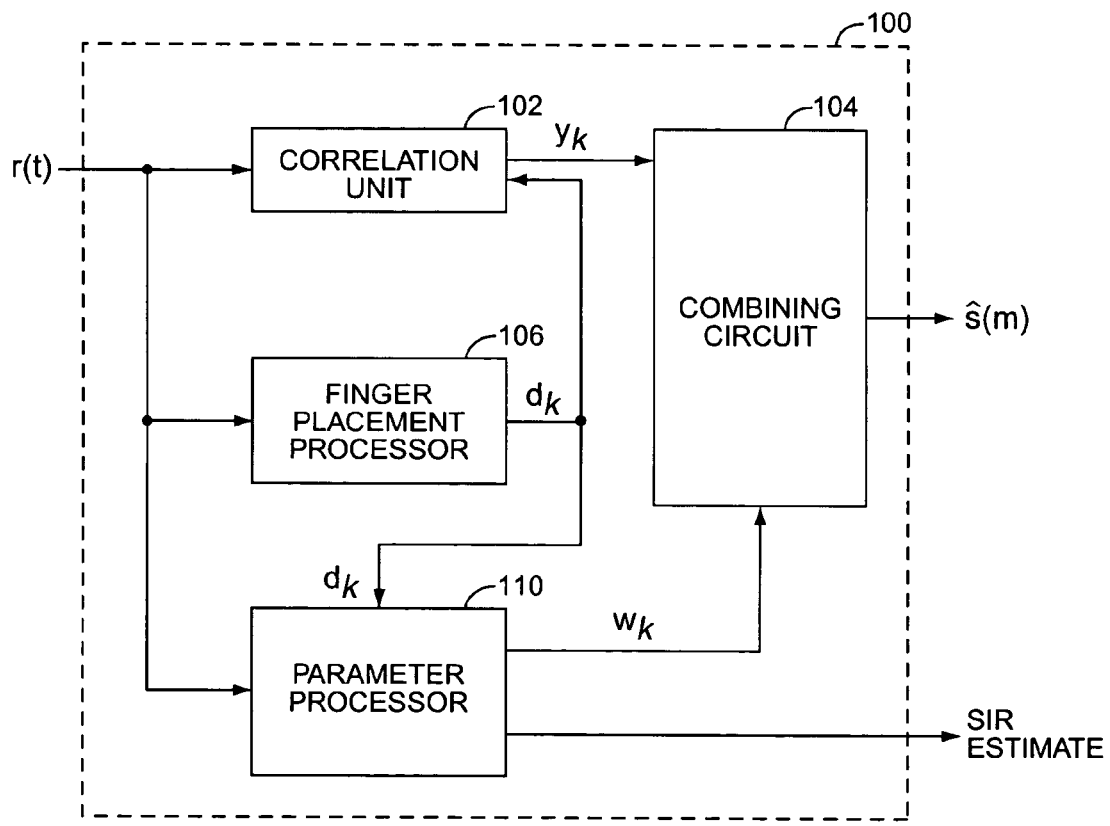
FIG. 3 illustrates an exemplary baseband processor of the present invention.

Baseband processor 100 may include a G-RAKE receiver, as shown in FIG. 3, for determining the desired symbol estimates while suppressing noise and interference. An exemplary G-RAKE receiver includes one or more correlation units 102, a combining circuit 104, a finger placement processor 106, and a parameter processor 110. Based on the baseband signal r(t), finger placement processor 106 identifies and selects one or more delays $d_k$ corresponding to signal paths of the multi-path channel as well as extra interference suppression delays. Each selected delay $d_k$ is provided to correlation unit 102, which despreads one or more traffic channel signals present in the baseband signal r(t) based on the provided delays $d_k$. As used herein, traffic channel signals include broadcast, control, and/or individual data signals. The selected delays $d_k$ are also provided to parameter processor 110 for computing a weighting factor $w_k$ for each delay $d_k$ and, optionally, for computing an SIR estimate. Combining circuit 104 receives each despread traffic channel signal $y_k$ and the corresponding weighting factor $w_k$, and generates symbol estimates ŝ(m) by weighting and coherently combining the despread traffic channel signals $y_k$ according to methods known in the art.

Figure 4:
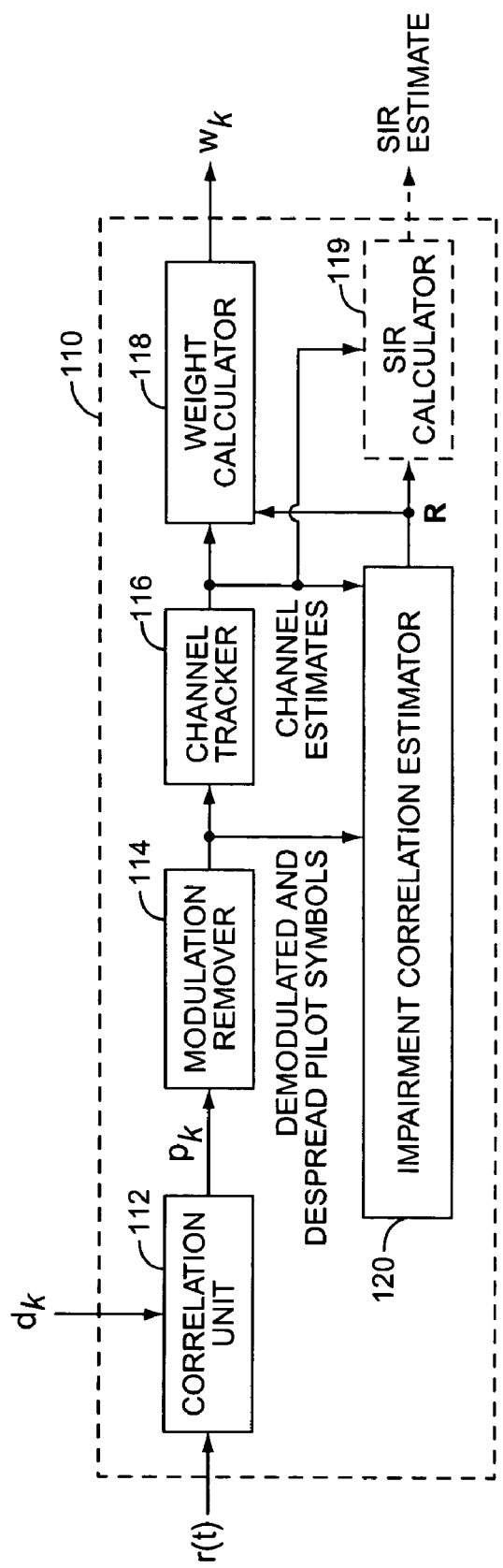
FIG. 4 illustrates an exemplary parameter processor of the present invention.

As shown in FIG. 3, parameter processor 110 calculates weighting factors $w_k$ based on the baseband signal r(t) and on the selected delays $d_k$. FIG. 4 illustrates an exemplary parameter processor 110 according to the present invention. Parameter processor 110 includes a pilot correlation unit 112, a modulation remover 114, a channel tracker 116, a weight calculator 118, an impairment correlation estimator 120, and optionally, an SIR calculator 119. The pilot correlation unit 112 uses the delays $d_k$ provided by the finger placement processor 106 to despread one or more pilot channel signals present in the baseband signal r(t). Modulation remover 114 removes the symbol modulation from the despread pilot symbols $p_k$ by, e.g., multiplying each despread pilot symbol $p_k$ by the complex conjugate of the known value to provide demodulated and despread pilot symbols. In systems with higher order modulation, modulation remover 114 may also divide the despread pilot symbol $p_k$ by the pilot symbol value, as is known in the art. Data symbols and decision feedback may also be used.

Channel tracker 116 uses the demodulated and despread pilot symbols to estimate the channel response coefficients, and therefore, to produce channel estimates. Based on the demodulated and despread pilot symbols from modulation remover 114 and the channel estimates from channel tracker 116, impairment correlation estimator 120 estimates an impairment correlation matrix R having one or more impairment correlation values corresponding to the set of delay paths being processed by receiver 24, 34. Note that the impairment correlation values in impairment correlation matrix R are based on both noise correlation terms and interference correlation terms. Because those skilled in the art will appreciate that "covariance" is a special case of "cross-correlation" with zero mean, the terms "correlation" and "covariance," as used herein, should be understood as interchangeable unless the context of a particular passage makes an explicit distinction between the two terms.

Weight calculator 118 uses the channel estimates and the impairment correlation values in the impairment correlation matrix R to calculate weighting factors corresponding to the delay paths of receiver 24, 34. The weighting factors are used to combine traffic despread values to form symbol estimates. As discussed above, accurate weighting factors $w_k$ are important for accurate interference suppression in G-RAKE receivers. Because the weighting factors $w_k$ directly relate to the estimated impairment correlation matrix R, interference suppression in G-RAKE receivers depends on the accurate estimation of the impairment correlation matrix R.

Figure 5A:
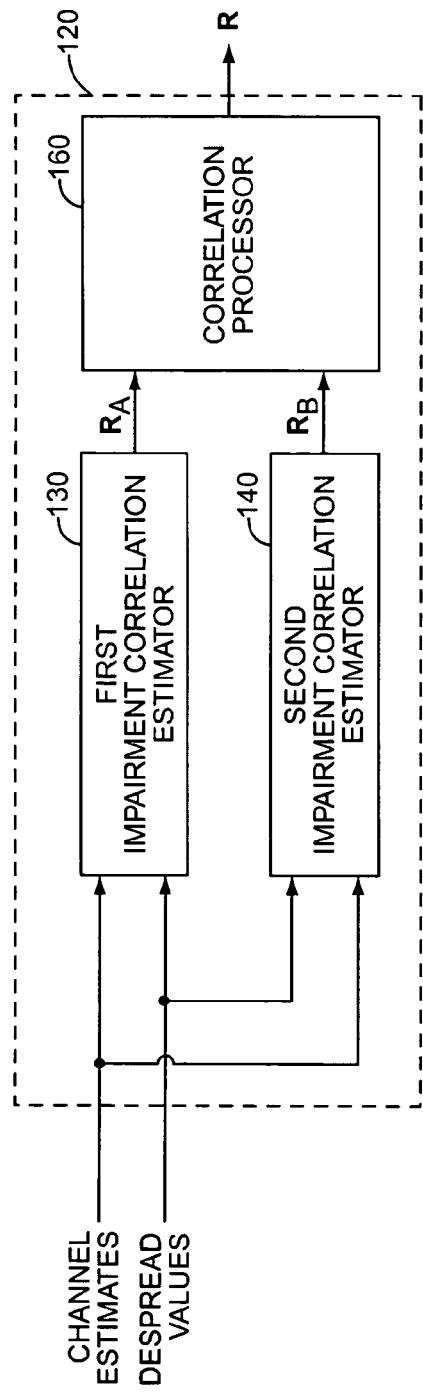
FIG. 5A illustrates an exemplary impairment correlation estimator according to the present invention.

FIG. 5A illustrates an exemplary impairment correlation estimator 120 for estimating impairment correlation matrices according to the present invention. Impairment correlation estimator 120 comprises a first impairment correlation estimator 130, a second impairment correlation estimator 140, and a correlation processor 160. First impairment correlation estimator 130 generates a first impairment correlation matrix $R_A$ based on the channel estimates and despread values. Similarly, the second impairment correlation estimator 140 generates a second impairment correlation matrix $R_B$ based on the channel estimates and despread values. Correlation processor 160 then derives the final impairment correlation matrix R based on the first and second impairment correlation matrices, $R_A$ and $R_B$.

The first and second impairment correlation estimators 130, 140 may be any impairment estimator that estimates an impairment correlation matrix. Exemplary first and second impairment correlation estimators 130, 140 may include those described in U.S. Pat. No. 6,363,104 ("Method and Apparatus for Interference Cancellation in a Rake Receiver" issued 26 Mar. 2002), U.S. patent application Ser. No. 09/344,899 ("RAKE Combining Methods and Apparatus Using Weighting Factors Derived from Knowledge of Spread Spectrum Signal Characteristics" filed 25 Jun. 1999), and U.S. patent application Ser. No. 10/800,167 ("Method and Apparatus for Parameter Estimation in a Generalized RAKE Receiver", filed 12 Mar. 2004), all of which are herein incorporated by reference. Additional exemplary impairment correlation estimators are also described in "Approaches for Fast Adaptive Generalized RAKE Reception" to Bottomley et al., in Research Disclosure, November 2003; "Performance of CDMA Mobile Communication Systems Using Antenna Arrays" to Suard et al., in Proc. IEEE ICASSP, 27-30 Apr. 1993, pp. IV-153 through IV-156; and "Pilot Channel-aided Techniques to Compute the Beamforming Vector for CDMA Systems with Antenna Array" to Choi in IEEE Trans. Veh. Technol., vol. 49, pp. 1760-1775, September 2000.

Figure 5B:
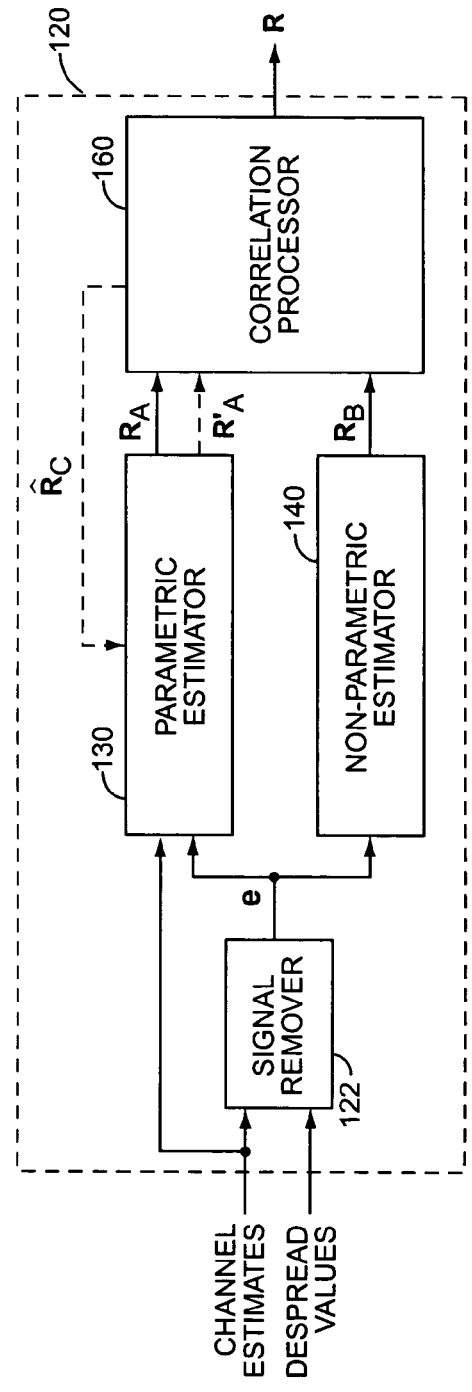
FIG. 5B illustrates another exemplary impairment correlation estimator according to the present invention.

In one exemplary embodiment of the present invention, the first and second impairment correlation estimators 130, 140 may be equivalent impairment correlation estimators programmed with different settings. Alternatively, in another exemplary embodiment of the present invention, the first and second impairment correlation estimators 130, 140 may be different types of impairment correlation estimators. For example, as shown in FIG. 5B, the first impairment correlation estimator 130 may be a parametric estimator 130 and the second impairment correlation estimator 140 may be a non-parametric estimator 140. These estimators share an initial processing step in which channel estimates and modulation-removed despread values are provided to signal remover 122. Signal remover 122 subtracts the channel estimates from the modulation-removed despread values to form an error vector e. In this embodiment, the correlation processor 160 derives the final impairment correlation matrix R from a parametric impairment correlation matrix $R_A$ and a non-parametric impairment correlation matrix $R_B$. While the following discussions describe the impairment correlation estimator 120 of the present invention in terms of a parametric estimator 130 and a non-parametric estimator 140, it will be appreciated by those skilled in the art that the first and second impairment correlation estimators 130, 140 may comprise any impairment correlation estimators known in the art.

Figure 7:
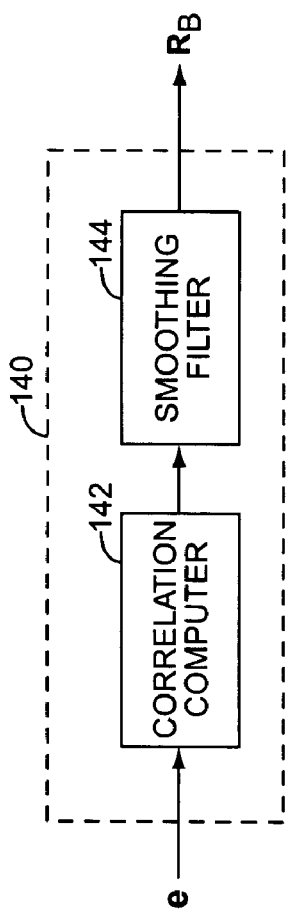
FIG. 7 illustrates an exemplary non-parametric estimator.
Figure 6:
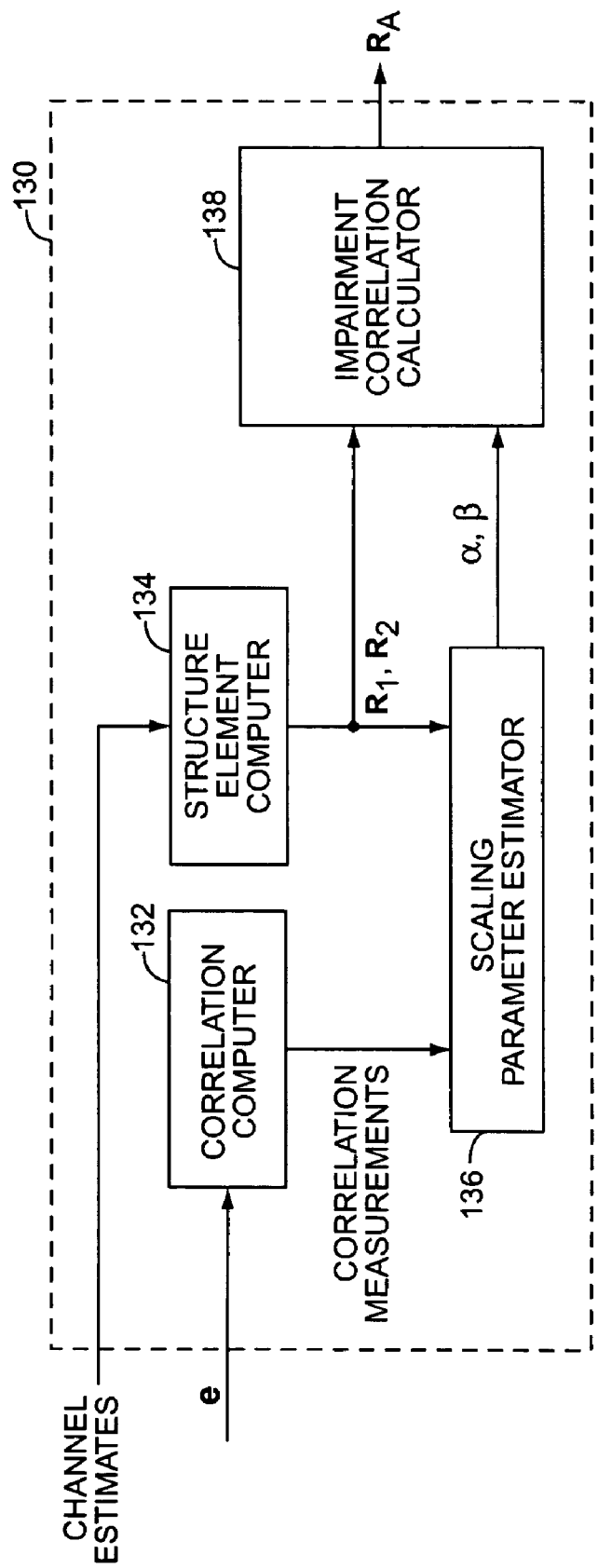
FIG. 6 illustrates an exemplary parametric estimator.

To facilitate further discussion of the present invention, FIGS. 6 and 7 illustrate exemplary parametric and non-parametric estimators 130, 140, respectively. A parametric estimator 130 models one or more sources of interference based on the received signal and generates the parametric impairment correlation matrix $R_A$ based on these interference models. As described in U.S. patent application Ser. No. 10/800,167 ("Method and Apparatus for Parameter Estimation in a Generalized RAKE Receiver", filed 12 Mar. 2004) and shown in FIG. 6, an exemplary parametric estimator 130 comprises a correlation computer 132, a structure element computer 134, a scaling parameter estimator 136, and an impairment correlation calculator 138. Correlation computer 132 receives the error vector e from the signal remover 122 and generates correlation measurements based on the values in the error vector e. In general, correlation computer 132 multiplies each error value in error vector e by the conjugates of another error value to produce the correlation measurements. These correlation measurements may, for example, be the result of several products averaged together over a CDMA time slot.

Structure element computer 134 constructs "structure" elements that define the structure of the parametric impairment correlation model(s). A typical structure element computer 134 constructs an interference structure element $R_1$ and a noise structure element $R_2$. The structure elements $R_1$ and $R_2$ are calculated according to the parametric impairment model(s) by structure element computer 134 based on the channel estimates provided by the channel tracker 116. More specifically, the values of the interference structure element $R_1$ are based on the channel estimates and knowledge of the receiver pulse shape, while the noise structure element $R_2$ is made of values that depend on the known receiver pulse shape.

Based on the correlation measurements from correlation computer 132 and the structure elements $R_1$, $R_2$ from the structure element computer 134, scaling parameter estimator 136 derives scaling parameters, α and β, for each of the structure elements. Using the scaling parameters α and β, and structure elements $R_1$ and $R_2$, the impairment correlation calculator 138 combines the structure elements to estimate the parametric impairment correlation matrix $R_A$. According to an exemplary parametric estimator 130, impairment correlation calculator 138 combines the structure elements according to:

$$R_A = \alpha R_1 + \beta R_2. \quad \text{(Eq. 1)}$$

Because the parametric impairment correlation matrix $R_A$ depends on the channel estimates, parametric estimator 130 is able to track rapid variations in the modeled interference, particularly in own-cell interference noise correlation. However, because the parametric estimator 130 does not model all forms of interference, some impairment correlations may not be properly accounted for in the impairment correlation matrix $R_A$.

To address this issue, the second impairment correlation estimator 140 of FIG. 5B may comprise a non-parametric estimator 140. Non-parametric estimator 140, as shown in FIG. 7, includes a correlation computer 142 and a smoothing filter 144. As with the parametric estimator 130, the correlation computer 142 in the non-parametric estimator 140 generates correlation measurements based on the error values in error vector e. The correlation measurements are then filtered over time, e.g., over multiple CDMA time slots of the received CDMA signal, in smoothing filter 144 to produce the non-parametric impairment correlation matrix $R_B$.

Because the accuracy of the non-parametric impairment correlation matrix $R_B$ is directly related to the length of time used to smooth the correlation measurements, the non-parametric estimator 140 cannot accurately track rapid variations in the interference. However, because the non-parametric impairment correlation matrix $R_B$ is not dependent on particular interference models, and instead is directly derived from the received signal, it necessarily includes all forms of interference. As such, by deriving an impairment correlation matrix R based on the parametric and the non-parametric impairment correlation matrices, $R_A$ and $R_B$, the impairment correlation estimator 120 of the present invention produces an impairment correlation matrix R that can track rapid variations in the interference while simultaneously including all forms of interference present in the received signal.

Correlation processor 160 may derive the final impairment correlation matrix based on the parametric and non-parametric impairment correlation matrices according to any preferred method. In a first embodiment, correlation processor 160 may comprise a selector 160, as shown in FIG. 8A, that selects either the parametric impairment correlation matrix $R_A$ or the non-parametric impairment correlation matrix $R_B$ for each CDMA time slot dependent upon which impairment correlation matrix best satisfies a predetermined criteria, such as interference suppression. For example, an SIR metric, M(R), may be calculated for each impairment correlation matrix, $R_A$ and $R_B$, according to:

$$M(R) = c^H R^{-1} c, \quad \text{(Eq. 2)}$$

where c is a vector of the channel estimates and where $c^H$ represents the Hermitian transpose of the vector of channel estimates. Selector 160 may select the impairment correlation matrix that maximizes the SIR metric M(R).

In another embodiment, shown in FIG. 8B, the correlation processor 160 may comprise a smoothing filter 162, a subtractor 164, and a summer 166. In this embodiment, smoothing filter 162 filters the values in the parametric impairment correlation matrix $R_A$ to produce a filtered parametric impairment correlation matrix $\overline{R}_A$ that has a filtering similar to that used by the non-parametric impairment correlation estimator 140. Subtractor 164 subtracts the filtered parametric impairment correlation matrix $\overline{R}_A$ from the non-parametric impairment correlation matrix $R_B$ to generate a residual correlation matrix $R_C$. The residual correlation matrix $R_C$ comprises impairment correlation values that correspond to impairment correlations detected by the non-parametric estimator 140, but that are not modeled by the parametric estimator 130. By adding the residual correlation matrix $R_C$ to the parametric impairment correlation matrix $R_A$ in summer 166, a final impairment correlation matrix R that includes both modeled and non-modeled interference is derived.

If the parametric estimator 130 does not model a significant interference source, the un-modeled interference source may bias the estimation of the scaling parameters, α and β. Correlation processor 160 may mitigate this bias effect by feeding back a term for the un-modeled interference source to the parametric estimator 130 and improving the interference model based on this term. To implement this mitigation effect, correlation processors 160 of FIGS. 8C and 8D include an additional smoothing filter 168 for generating a filtered or final version $\hat{R}_C$ of the residual correlation matrix $R_C$. By feeding the filtered residual correlation matrix $\hat{R}_C$ back into the parametric estimator 130, the filtered residual correlation matrix $\hat{R}_C$ augments the parametric impairment correlation matrix $R_A$. For example, the filtered residual correlation matrix $\hat{R}_C$ may be provided to both the impairment correlation calculator 138 and the scaling parameter estimator 136 of the parametric estimator 130. In response, the scaling parameter estimator 136 may estimate α and β, in addition to an additional scaling factor γ. The impairment correlation calculator 138 then augments the parametric impairment correlation matrix $R_A$ according to:

$$R'_A = \alpha R_1 + \beta R_2 + \gamma \hat{R}_C, \qquad (Eq. 3)$$

where $R'_A$ represents the augmented parametric impairment correlation matrix. Note that parametric estimator 130 uses the augmented matrix $R'_A$ of Equation 3 to determine α, β, and γ. These fitting parameters are then used in Equations 1 and 3 to determine $R_A$ and $R'_A$. For the correlation processor 160 of FIG. 8C, $R_A$, calculated in Equation 1 and based on the new α and β provided by scaling parameter estimator 136, is summed with residual correlation matrix $R_C$ in summer 166 to generate the final impairment correlation matrix R. For the correlation processor 160 of FIG. 8D, the augmented matrix $R'_A$ may be used as the final R matrix.

Figure 9:
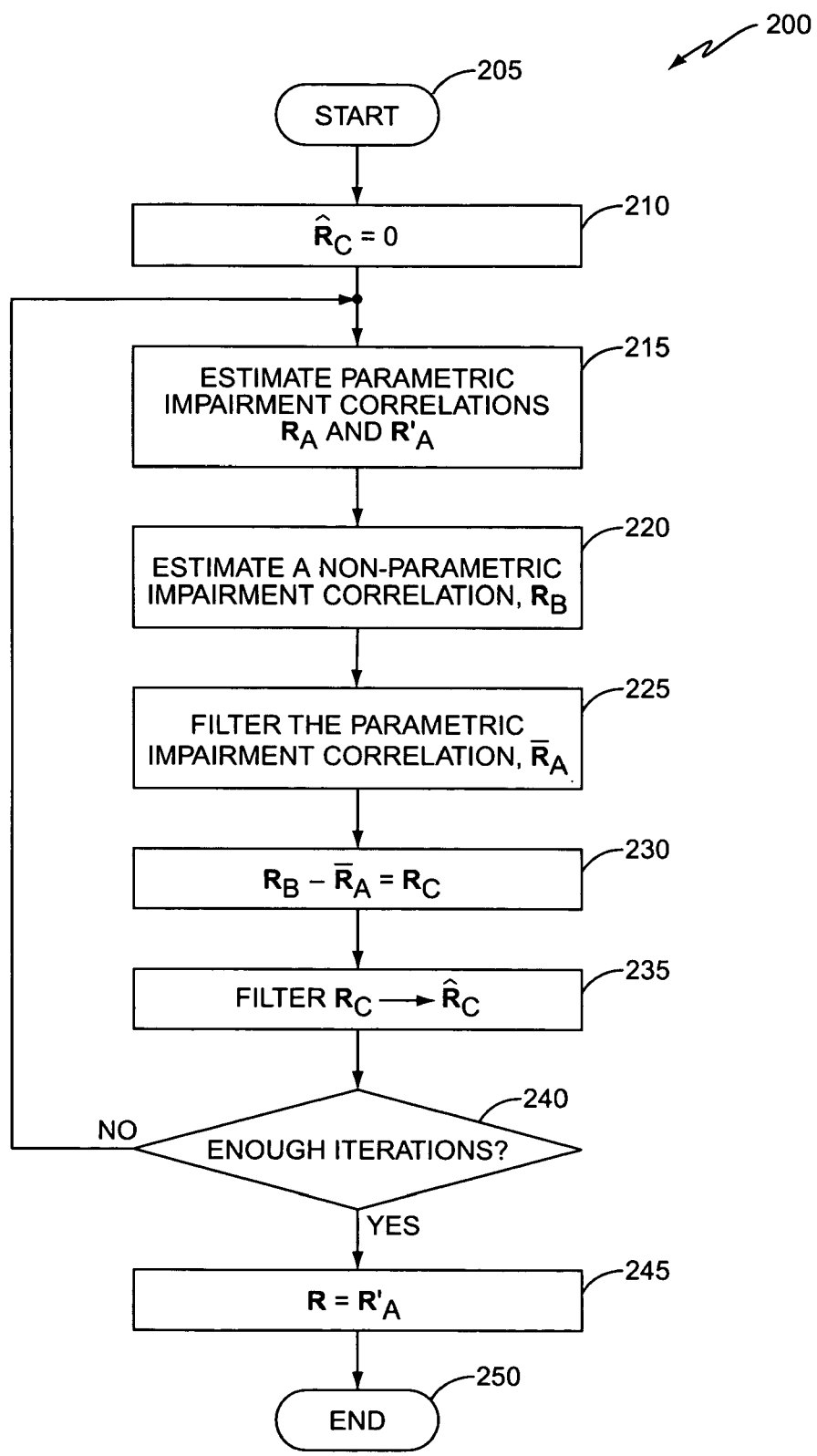
FIG. 9 illustrates an exemplary method for deriving an impairment correlation matrix according to the present invention.

FIG. 9 illustrates an exemplary method for implementing the impairment correlation estimator 120 of FIG. 5B using the correlation processor 160 of FIG. 8C or 8D. The impairment correlation estimation process begins (block 205) by initializing the filtered residual correlation matrix $\hat{R}_C$ to zero (block 210). The parametric estimator 130 estimates the parametric impairment correlation matrix $R_A$ and the "augmented" parametric impairment correlation matrix $R'_A$ as described above using Equation 1 and Equation 3 (block 215), and the non-parametric estimator 140 estimates the non-parametric impairment correlation matrix $R_B$ as described above with reference to FIG. 7 (block 220). Because the filtered residual correlation matrix $\hat{R}_C$ has been initialized to zero, the initial estimation of the augmented impairment parametric correlation matrix $R'_A$ is the same as the parametric impairment correlation matrix $R_A$ of Equation 1.

After filtering the parametric impairment correlation matrix $R_A$ (block 225), the residual correlation matrix $R_C$ is generated by subtracting the filtered parametric impairment correlation matrix $\overline{R}_A$ from the non-parametric impairment correlation matrix $R_B$ (block 230). Smoothing filter 168 then filters the residual correlation matrix $R_C$ (block 235) to generate the filtered residual correlation matrix $\hat{R}_C$ that is fed back to the parametric estimator 130 and that replaces the initialized filtered residual correlation matrix $\hat{R}_C$.

The steps of generating the augmented and non-augmented parametric impairment correlation matrices $R'_A$ and $R_A$ (block 215), the non-parametric impairment correlation matrix $R_B$ (block 220), the residual correlation matrix $R_C$ (blocks 225 and 230), and the filtered residual correlation matrix $\hat{R}_C$ (block 235) are repeated until a stopping criteria has been met (block 240). For example, the stopping criteria may simply be defined by a desired number of iterations, such as two iterations or three iterations. Alternatively, the stopping criteria may be based on an evaluation of the filtered residual correlation matrix $\hat{R}_C$ to see if $\hat{R}_C$ is converging and/or on an evaluation of the scaling factors α, β, and γ to see if they are converging. In any event, once a sufficient number of iterations have been performed (block 240), the final impairment correlation matrix R is calculated as the augmented parametric impairment correlation matrix $R'_A$ (block 245), as shown in FIG. 8D, and the process ends (block 250). This process is repeated for one or more time slots of the received signal. Note that alternatively, the final impairment correlation matrix R may be calculated by adding the parametric impairment correlation matrix $R_A$ to the residual correlation matrix $R_C$, as is done in FIG. 8C.

Figure 10:
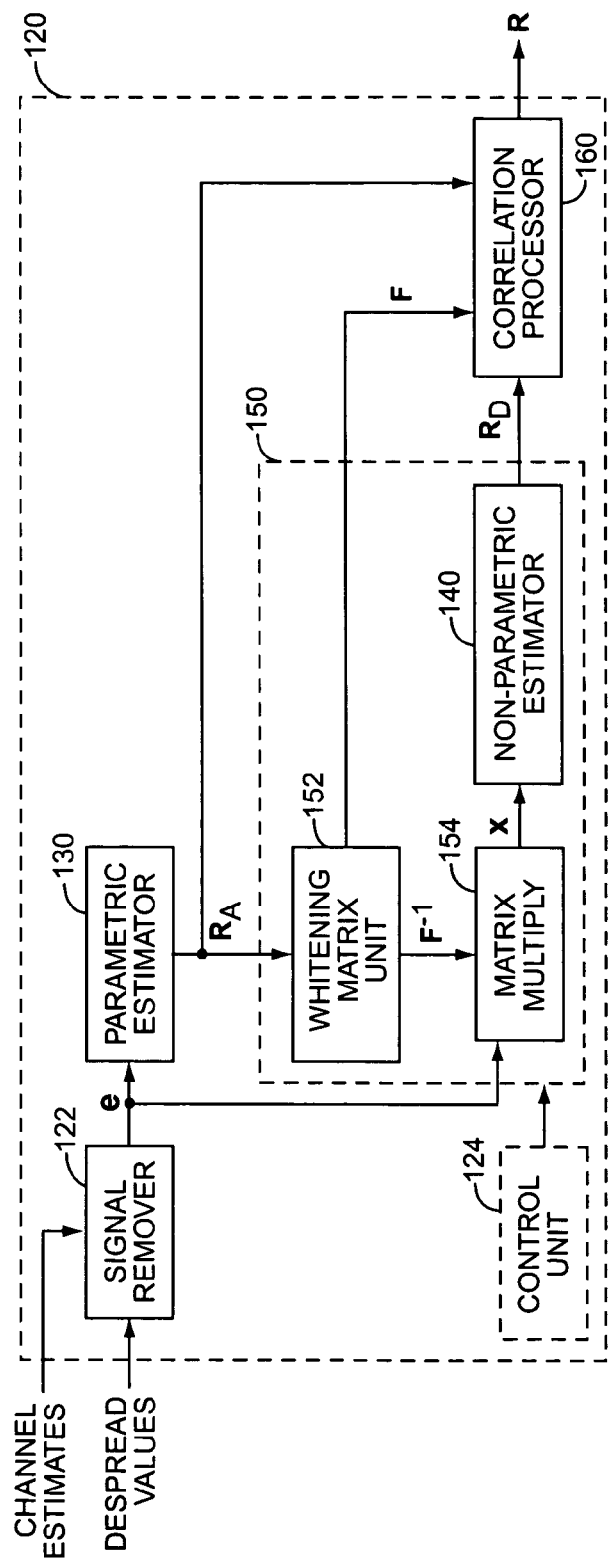
FIG. 10 illustrates another exemplary impairment correlation estimator according to the present invention.

In another exemplary embodiment of the present invention, the impairment correlation estimator 120 may be implemented as shown in FIG. 10. The impairment correlation estimator 120 of FIG. 10 includes the signal remover 122, the parametric estimator 130, a non-parametric estimator system 150, correlation processor 160, and optionally, a control unit 124. As described above, parametric estimator 130 generates a parametric impairment correlation matrix $R_A$ from the error vector e provided by the signal remover 122. However, unlike the non-parametric estimator 140 described above, the non-parametric estimator system 150 of FIG. 10 generates a non-parametric impairment correlation matrix $R_D$ based on the parametric impairment correlation matrix $R_A$. Correlation processor 160 then derives the final impairment correlation matrix from the parametric impairment correlation matrix $R_A$ and the non-parametric correlation matrix $R_D$ generated by the parametric estimator 130 and the non-parametric estimator system 150, respectively.

As shown in FIG. 10, non-parametric estimator system 150 includes whitening matrix unit 152, a matrix multiplier 154, and a non-parametric estimator 140. Whitening matrix unit 152 computes a whitening matrix $F^{-1}$ from the parametric impairment correlation matrix $R_A$. In exemplary embodiments, the whitening matrix $F^{-1}$ is derived from the inverse of the square root of the parametric impairment correlation matrix $R_A$, where the square root is obtained through Cholesky factorization as well understood in the art. Specifically, if the parametric impairment correlation matrix $R_A$ is factored using the Cholesky decomposition, $R_A$ may be represented as:

$$R_A = FF^H, \qquad (Eq. 4)$$

where the "H" represents the Hermitian transpose operation. The whitening matrix is the inverse of F, which is denoted as $F^{-1}$. Techniques for obtaining a whitening matrix are known in the art, and are, for example, described further in section 6.6 of "Detection of Signals in Noise, $2^{nd}$ Edition" by R. N. McDonough and A. D. Whalen, published by Academic Press in 1995. It will be appreciated that when $R_A$ is diagonally dominant, a simple form of Cholesky factorization may be used, which takes the square root of each diagonal element to generate the matrix F. The whitening matrix $F^{-1}$ is then obtained by taking the reciprocal of each diagonal element. Whitening matrix unit 152 may determine if the parametric impairment correlation matrix $R_A$ is diagonally dominant according to any means known in the art. For example, whitening matrix unit 152 may determine that parametric impairment correlation matrix $R_A$ is diagonally dominant by comparing the sum of the magnitude square of the off-diagonal elements to a threshold. If the sum exceeds the threshold, $R_A$ is not diagonally dominant. Alternatively, the whitening matrix unit 152 may compute a first SIR using $R_A$ with the diagonal elements and a second SIR using the $R_A$ without the diagonal elements. Comparing the ratio of the first and second SIRs to a threshold determines if the parametric impairment correlation matrix $R_A$ is diagonal dominant.

In any event, matrix multiplier 154 multiplies the error vector e by the whitening matrix $F^{-1}$ according to $$x=F^{-1}e \quad \text{(Eq. 5)}$$

to produce a whitened error vector x. Non-parametric estimator 140, which corresponds to the non-parametric estimator 140 of FIG. 7, then estimates the non-parametric impairment correlation matrix $R_D$ based on the whitened error vector x.

Figure 11:
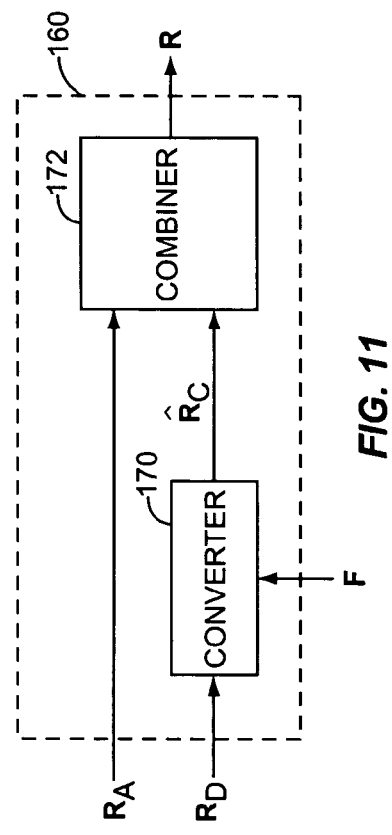
FIG. 11 illustrates an exemplary correlation processor for the impairment correlation estimator of FIG. 10.

Correlation processor 160 derives the final impairment correlation matrix R based on the parametric impairment correlation matrix $R_A$, the whitening inverse matrix F, and the non-parametric impairment correlation matrix $R_D$. To achieve this derivation, an exemplary correlation processor 160 may comprise a converter 170 and a combiner 172, as shown in FIG. 11. Converter 170 applies the whitening matrix inverse F to the non-parametric impairment correlation matrix $R_D$ to produce the final residual correlation matrix $\hat{R}_C$. In exemplary embodiments, the converter 170 generates the final residual correlation matrix $\hat{R}_C$ according to:

$$\hat{R}_C = F(R_D - I)F^H. \quad \text{(Eq. 6)}$$

Combiner 172 combines the parametric impairment correlation matrix $R_A$ with the final residual correlation matrix $\hat{R}_C$ by summing the two matrices to derive the final impairment correlation matrix R.

Figure 12:
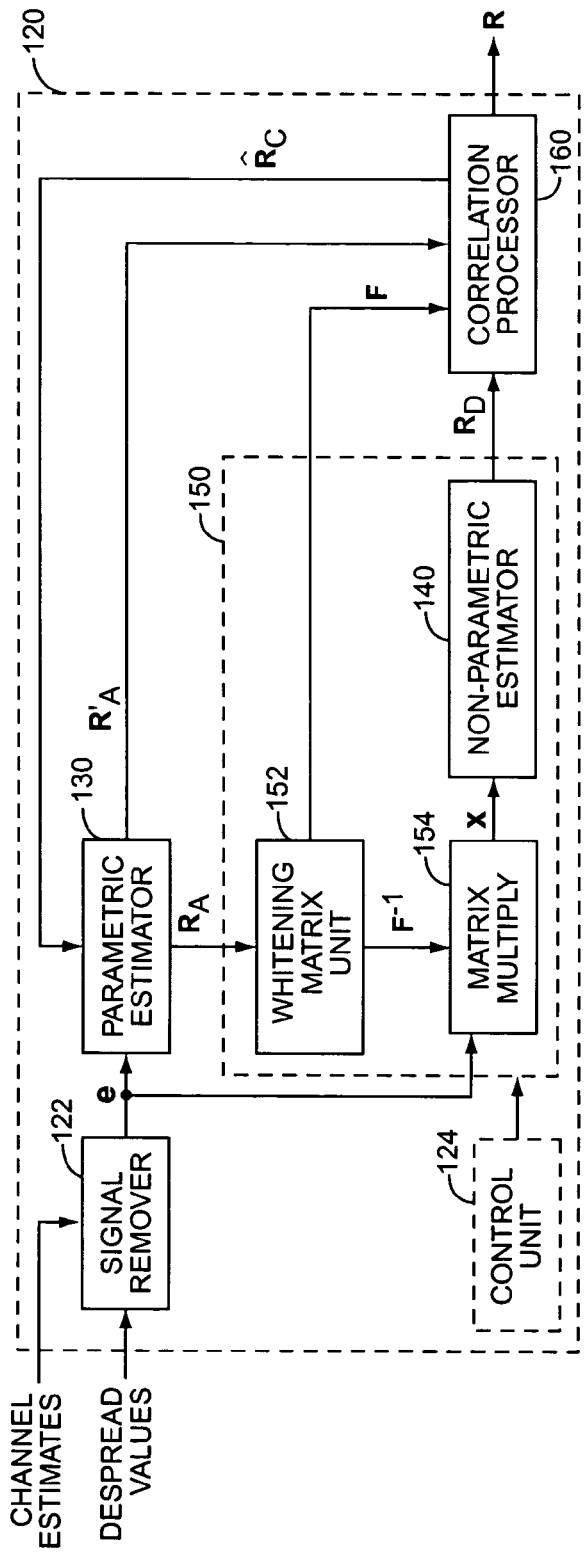
FIG. 12 illustrates another exemplary impairment correlation estimator according to the present invention.
Figure 13:
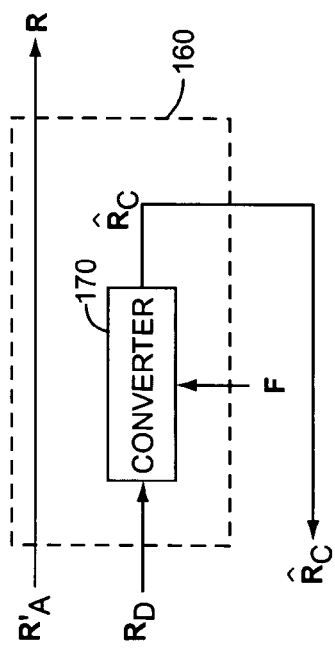
FIG. 13 illustrates an exemplary correlation processor for the impairment correlation estimator of FIG. 12.

Alternatively, as shown in FIG. 12, correlation processor 160 may derive the final impairment correlation matrix R based on an augmented parametric impairment correlation matrix $R'_A$, the whitening matrix inverse F, and the non-parametric impairment correlation matrix $R_D$. In this embodiment, the correlation processor 160 of FIG. 12 comprises a converter 170, as shown in FIG. 13. As with the converter 170 of FIG. 11, converter 170 of FIG. 13 applies the whitening matrix inverse F to the non-parametric impairment correlation matrix $R_D$ to generate a final residual correlation matrix $\hat{R}_C$. Final residual correlation matrix $\hat{R}_C$ is then fed back into the parametric estimator 130. Parametric estimator 130 uses the final residual correlation matrix $\hat{R}_C$ to generate an augmented parametric impairment correlation matrix $R'_A$, which may be derived from the final residual correlation matrix $\hat{R}_C$ according to Equation 3, as described above. Correlation processor 160 then derives the final impairment correlation matrix R directly from the augmented parametric impairment correlation matrix $R'_A$.

Figure 14:
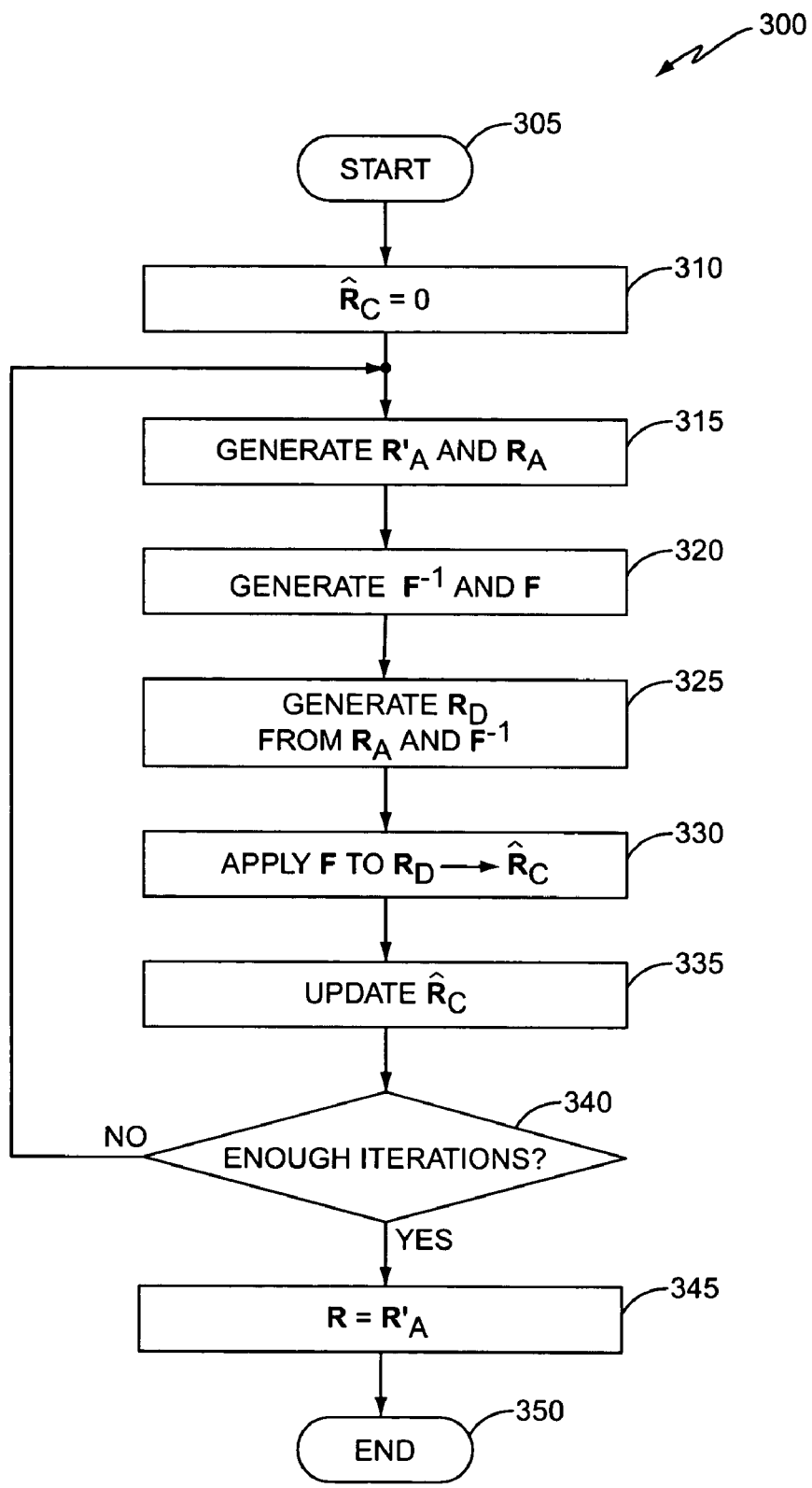
FIG. 14 illustrates another exemplary method for deriving an impairment correlation matrix according to the present invention.

FIG. 14 illustrates an exemplary method for implementing the impairment correlation estimator 120 of FIG. 12 using the correlation processor 160 of FIG. 13. The impairment correlation estimation process begins (block 305) by initializing the final residual correlation matrix $\hat{R}_C$ to zero (block 310). Parametric estimator 130 forms the parametric impairment correlation matrix $R_A$ and the "augmented" parametric impairment correlation matrix $R'_A$ by learning fitting parameters and applying these fitting parameters as described above using Equations 1 and 3, respectively, (block 315). Whitening matrix unit 152 generates the whitening matrix $F^{-1}$ and whitening matrix inverse F from the parametric impairment correlation matrix $R_A$ as described above (block 320). Matrix multiplier 154 and the non-parametric estimator 140 generate the non-parametric impairment correlation matrix $R_D$ as described above (block 325). Converter 170 applies the whitening matrix inverse F to the non-parametric impairment correlation matrix $R_D$ to generate the final residual correlation matrix $\hat{R}_C$ (block 330), replaces the initialized final residual correlation matrix $\hat{R}_C$ with the newly calculated final residual correlation matrix $\hat{R}_C$ (block 335), and provides $\hat{R}_C$ to the parametric estimator 130.

The steps of generating the parametric impairment correlation matrices $R_A$ and $R'_A$ (block 315), the non-parametric impairment correlation matrix $R_D$ (blocks 320 and 325), and the final residual correlation matrix $\hat{R}_C$ (blocks 330 and 335) are repeated until a stopping criteria has been met (block 340). For example, the stopping criteria may simply be defined by a desired number of iterations, such as two iterations or three iterations. Alternatively, the stopping criteria may be based on an evaluation of the final residual correlation matrix $\hat{R}_C$ to see if $\hat{R}_C$ is converging and/or on an evaluation of the scaling factors α, β, and γ to see if they are converging. In any event, once a sufficient number of iterations have been performed (block 340), the final impairment correlation matrix R is defined as the augmented parametric impairment correlation matrix $R'_A$ (block 345), and the process ends (block 350). This process is repeated for one or more time slots of the received signal.

As shown in FIGS. 10 and 12, some embodiments of the impairment correlation estimator 120 may include a control unit 124. Control unit 124 may simplify the whitening matrix calculations, as discussed above. In addition, control unit 124 may conserve power associated with the base station 20 or mobile station 30 by intelligently applying the impairment correlation matrix estimation process of the present invention only to the time slots where the parametric impairment correlation matrix estimate does not satisfy predetermined color criteria. For example, for each time slot of a received spread spectrum signal, control unit 124 evaluates the current parametric impairment correlation matrix $R_A$ (non-augmented) to determine how much color is present in the current impairment correlation matrix $R_A$ of the current time slot. When control unit 124 determines that the current impairment correlation matrix $R_A$ of a particular time slot contains sufficient color, as compared to a predetermined color criteria, control unit 124 temporarily deactivates non-parametric estimator system 150 and the converter 170 in correlation processor 160 to conserve power, and identifies the parametric impairment correlation matrix $R_A$ as the final impairment correlation matrix R for that time slot. One exemplary color criteria may be a fitness measure between $R_A$ and the measured correlations that is used to decide if further sources of correlation may be learned by system 150. For example, if the fitness measure indicates that $R_A$ sufficiently models the measured correlations, then the non-parametric estimator may not be necessary. Alternatively, if the fitness measure indicates that $R_A$ does not sufficiently model the measured correlations, then the non-parametric estimator may be necessary to address the color that is not modeled by the parametric estimator.

The above describes a method and apparatus for deriving an impairment correlation matrix R from first and second impairment correlation matrices to accurately track variations in modeled and non-modeled interference, such as self-interference, multi-user access interference, etc., in a wireless receiver. The wireless receiver may be disposed in any wireless communication terminal, such as a base station and/or a mobile station. A parameter processor 110 of the wireless receiver may use the derived impairment correlation matrix R to calculate various signal processing parameters. For example, using the final impairment correlation matrix R derived according to any of the above-described processes, weighting factors $w_k$ may be calculated in weighting calculator 118 according to any known method. For example, a weighting vector w comprising one or more weighting factors $w_k$ may be calculated according to:

$$w = R^{-1}c. \quad (Eq. 7)$$

Alternatively, the weighting vector w may be calculated according to:

$$w = (F^{-1})^H R_D^{-1} F^{-1} c + R_A^{-1} c. \quad (Eq. 8)$$

According to yet another method, the despread values are whitened and then combined using:

$$w = R_D^{-1} F^{-1} c. \quad (Eq. 9)$$

In any event, the weighting factors $w_k$ in the weighting vector w are used in the G-RAKE receiver to improve the performance of the receiver, as described above.

Further, using the final impairment correlation matrix R derived according to any of the above-described processes, a signal-to-interference ratio (SIR) may be estimated by SIR calculator 119 according to any known method. For example, the SIR may be estimated according to:

$$SIR_{est} = c^H R^{-1} c \quad (Eq. 10)$$

SIR estimation is a part of the power control, which controls the transmit power necessary to maintain the communication link. SIR estimation is also used in link adaptation to provide the highest possible data rate for a given power budget. In any event, the final impairment correlation matrix R of the present invention may be used to improve the power control process associated with the transmitter by providing improved SIR estimates.

The above describes an impairment correlation matrix estimation process and apparatus. To facilitate the above discussions, specific examples are provided. However, these examples are not intended to be limiting. For example, while a G-RAKE receiver is used herein to describe the invention, those skilled in the art will appreciate that the present invention is not limited to G-RAKE receivers, and is applicable to any spread spectrum receiver that estimates impairment correlation values. For example, the present invention is also applicable to the receiver described in U.S. patent application Ser. No. 10/672,127 entitled "Method and Apparatus for RAKE Receiver Combining Weight Generation," filed 26 Sep. 2003. Further, while the above described impairment correlation estimators 120 use parametric and non-parametric estimators, it will be appreciated by those skilled in the art that any impairment correlation estimator may be used in place of either the parametric and/or the non-parametric estimator. The two impairment correlation estimators may be different types of impairment correlation estimators, as shown and described above, or they may be equivalent impairment correlation estimators programmed with different settings. Further, it will be appreciated by those skilled in the art that more than two impairment correlation estimators may be used according to the present invention to derive the final impairment correlation matrix R.

In addition, those skilled in the art will appreciate that the above described impairment correlation matrix estimation process may be applied to wireless communication systems with one or more transmit and/or receive antennas. For example, a wireless communication system that includes multiple transmit antennas may use a receiver with an impairment correlation estimator 120 that includes a parametric estimator 130 for each of the transmit antennas. A wireless communication system that includes multiple receive antennas may have a non-parametric estimator system 150 that estimates impairment correlations across all fingers of the G-RAKE receiver, where each finger may differ in delay, antenna, or both.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein. Further, it should be emphasized that the term "comprises/comprising" when used in this specification is taken to specify the presence of stated features, steps, or components, but does not preclude the presence or addition of one or more other features, steps, components, or groups thereof.

What is claimed is:

1. A method of estimating an impairment correlation matrix in a spread spectrum wireless receiver comprising:
   estimating a first impairment correlation matrix representing at least one impairment based on despread symbols received over multiple paths of a multi-path channel;
   estimating a second impairment correlation matrix for said impairment based on the despread symbols; and
   deriving a final impairment correlation matrix for said impairment based on the first and second impairment correlation matrices.

2. The method of claim 1 wherein deriving the final impairment correlation matrix based on the first and second impairment correlation matrices comprises selecting one of the first and second impairment correlation matrices as the final impairment correlation matrix.

3. The method of claim 2 wherein selecting one of the first and second impairment correlation matrices as the final impairment correlation matrix comprises selecting the first impairment correlation matrix as the final impairment correlation matrix when a color of the first impairment correlation matrix meets or exceeds a predetermined color criteria.

4. The method of claim 1 wherein deriving the final impairment correlation matrix from the first and second impairment correlation matrices comprises combining the first and second impairment correlation matrices.

5. The method of claim 4 wherein combining the first and second impairment correlation matrices comprises:
   subtracting a filtered version of the first impairment correlation matrix from the second impairment correlation matrix to generate a residual correlation matrix; and
   adding the residual correlation matrix to the first impairment correlation matrix to derive the final impairment correlation matrix.

6. The method of claim 1 wherein deriving the final impairment correlation matrix from the first and second impairment correlation matrices comprises:
   subtracting a filtered version of the first impairment correlation matrix from the second impairment correlation matrix to generate a residual correlation matrix;
   filtering the residual correlation matrix;
   augmenting the first impairment correlation based on the filtered residual correlation matrix to generate an augmented correlation matrix; and
   deriving the final impairment correlation matrix based on the augmented correlation matrix.

7. The method of claim 1 wherein estimating the second impairment correlation matrix based on the despread symbols comprises estimating the second impairment correlation matrix based on the first impairment correlation matrix.

8. The method of claim 7 wherein deriving the final impairment correlation matrix based on the first and second impairment correlation matrices comprises:
   computing a whitening matrix based on the first impairment correlation matrix;
   applying an inverse of the whitening matrix to the second impairment correlation matrix to generate a final residual correlation matrix; and
   combining the first impairment correlation matrix with the final residual correlation matrix to derive the final impairment correlation matrix.

9. The method of claim 7 wherein deriving the final impairment correlation matrix based on the first and second impairment correlation matrices comprises:
   computing a whitening matrix inverse based on the first impairment correlation matrix;
   applying the whitening matrix inverse to the second impairment correlation matrix to generate a final residual correlation matrix;
   augmenting the first impairment correlation matrix based on the final residual correlation matrix to generate an augmented correlation matrix; and
   deriving the final impairment correlation matrix based on the augmented correlation matrix.

10. The method of claim 7 wherein estimating the second impairment correlation matrix based on the first impairment correlation matrix comprises:
    generating a whitening matrix based on the first impairment correlation matrix;
    computing a whitened error vector based on the whitening matrix; and
    estimating the second impairment correlation matrix based on the whitened error vector.

11. The method of claim 10 further comprising generating a despread error vector based on the despread values, wherein computing a whitened error vector based on the whitening matrix comprises multiplying the despread error vector by the whitening matrix.

12. The method of claim 1 further comprising generating a despread error vector based on the despread values, wherein estimating the first and second impairment correlation matrices based on the despread symbols comprises estimating the first and second impairment correlation matrices based on the despread error vector.

13. The method of claim 1 wherein estimating the first impairment correlation matrix based on the despread symbols comprises determining channel estimates based on the despread symbols and estimating a parametric impairment correlation matrix based on the channel estimates.

14. The method of claim 1 wherein estimating the second impairment correlation matrix based on the despread symbols comprises estimating a non-parametric impairment correlation matrix based on the despread symbols.

15. The method of claim 1 further comprising generating weighting factors based on the final impairment correlation matrix and combining traffic despread symbols using the weighting factors to suppress interference.

16. The method of claim 1 further comprising estimating a signal-to-interference ratio based on the final impairment correlation matrix.

17. The method of claim 1 wherein estimating the first and second impairment correlation matrices comprises estimating the first and second correlation matrices for multiple time slots of a received signal, and wherein deriving the final impairment correlation matrix based on the first and second impairment correlation matrices comprises selecting the first impairment correlation matrix as the final impairment correlation matrix for the time slots when a color of the first impairment correlation matrix meets or exceeds a predetermined color criteria.

18. The method of claim 1 wherein the spread spectrum wireless receiver comprises a RAKE receiver.

19. The method of claim 1 wherein the wireless spread spectrum receiver is disposed in at least one of a mobile station and a base station.

20. The method of claim 1 wherein estimating the first and second impairment correlation matrices comprises determining channel estimates based on the despread symbols and estimating at least one of the first impairment correlation matrix and the second impairment correlation matrix based on the channel estimates.

21. An impairment correlation estimator in a spread spectrum wireless receiver comprising:
    a first correlation estimator for estimating a first impairment correlation matrix representing at least one impairment based on despread symbols received over multiple paths of a multi-path channel;
    a second correlation estimator for estimating a second impairment correlation matrix for said impairment based on the despread symbols; and
    a correlation processor for deriving a final impairment correlation matrix for said impairment based on the first and second impairment correlation matrices.

22. The impairment correlation estimator of claim 21 wherein the correlation processor comprises a selector for selecting one of the first and second impairment correlation matrices as the final impairment correlation matrix.

23. The impairment correlation estimator of claim 21 wherein the correlation processor comprises a combiner for combining the first and second impairment correlation matrices to derive the final impairment correlation matrix.

24. The impairment correlation estimator of claim 23 wherein the combiner comprises:
    a smoothing filter for smoothing the first impairment correlation matrix;
    a subtractor for subtracting the smoothed first impairment correlation matrix from the second impairment correlation matrix to generate a residual correlation matrix; and
    a summer for combining the residual correlation matrix with the first impairment correlation matrix to derive the final impairment correlation matrix.

25. The impairment correlation estimator of claim 21 wherein the correlation processor comprises:
    a smoothing filter for smoothing the first impairment correlation matrix;
    a subtractor for subtracting the smoothed first impairment correlation matrix from the second impairment correlation matrix to generate a residual correlation matrix;
    a feedback loop for filtering the residual correlation matrix and augmenting the first impairment correlation matrix based on the filtered residual correlation matrix to generate an augmented correlation matrix; and
    means for deriving a final impairment correlation matrix based on the augmented correlation matrix.

26. The impairment correlation estimator of claim 21 wherein the second correlation estimator further estimates the second impairment correlation matrix based on the first impairment correlation matrix.

27. The impairment correlation estimator of claim 26 wherein the correlation processor comprises:

a converter to apply an inverse of a whitening matrix to the second impairment correlation matrix to generate a final residual correlation matrix; and a combiner to combine the first impairment correlation matrix with the final residual correlation matrix to derive the final impairment correlation matrix.

28. The impairment correlation estimator of claim 26 wherein the correlation processor comprises a converter to apply an inverse of a whitening matrix to the second impairment correlation matrix to generate a final residual correlation matrix, wherein the first correlation estimator applies the final residual correlation matrix to the first impairment correlation matrix to generate an augmented correlation matrix and wherein the correlation processor derives the final impairment correlation matrix from the augmented correlation matrix.

29. The impairment correlation estimator of claim 26 wherein the second correlation estimator comprises:

a whitening matrix unit for generating a whitening matrix based on the first impairment correlation matrix;

a multiplier for generating a whitened error vector based on the whitening matrix, the despread symbols, and the channel estimates; and an impairment estimator for estimating the second impairment correlation matrix based on the whitened error vector.

30. The impairment correlation estimator of claim 29 further comprising a signal remover for determining a despread error vector based on the despread symbols and channel estimates, wherein the multiplier multiplies the despread error vector by the whitening matrix to generate the whitened error vector.

31. The impairment correlation estimator of claim 21 further comprising a signal remover for generating a despread error vector based on the despread symbols and the channel estimates, wherein the first and second estimators estimate the first and second impairment correlation matrices based on the despread error vector.

32. The impairment correlation estimator of claim 21 wherein the first correlation estimator is a parametric estimator and wherein the first impairment correlation matrix is a parametric impairment correlation matrix.

33. The impairment correlation estimator of claim 32 wherein the parametric estimator comprises:

a correlation computer for measuring impairment correlations based on the despread values;

a structure element computer for determining structured elements of an impairment model based on channel estimates;

a parameter estimator for determining model fitting parameters based on the structured elements and the measured impairment correlations; and an impairment correlation calculator for calculating the first impairment correlation matrix based on the model fitting parameters and the structured elements.

34. The impairment correlation estimator of claim 33 wherein the impairment correlation calculator calculates the parametric impairment correlation matrix $R_A$ according to:

$$R_A = \alpha R_1 + \beta R_2,$$

where $\alpha$ and $\beta$ are model fitting parameters and $R_1$ and $R_2$ are structured elements corresponding to one or more impairment models.

35. The impairment correlation estimator of claim 21 wherein the second correlation estimator is a non-parametric estimator and wherein the second impairment correlation matrix is a non-parametric impairment correlation matrix.

36. The impairment correlation estimator of claim 35 wherein the non-parametric estimator comprises:

a correlation computer for measuring impairment correlations based on the despread values; and a filter for filtering the impairment correlation measurements over multiple time slots of a received signal.

37. The impairment correlation estimator of claim 36 further comprising a signal remover for determining a despread error vector based on the despread symbols and on channel estimates, wherein the correlation computer multiplies despread error values in the despread error vector by conjugates of other despread error values in the despread error vector to generate the measured impairment correlations.

38. The impairment correlation estimator of claim 21 further comprising a control unit for evaluating a color of the first impairment correlation matrix.

39. The impairment correlation estimator of claim 38 wherein the control unit disables at least the second correlation estimator when the color of the first impairment correlation matrix meets or exceeds a predetermined color criteria.

40. The impairment correlation estimator of claim 21 wherein the wireless receiver is disposed in at least one of a mobile station and a base station.

41. A method of suppressing interference in a wireless spread spectrum receiver comprising:

despreading symbols received over multiple paths of a multi-path channel;

estimating first and second impairment correlation matrices representing at least one impairment based on the despread symbols;

deriving a final impairment correlation matrix for said impairment based on the first and second impairment correlation matrices; and combining the despread symbols using weighting factors determined from the final impairment correlation matrix to suppress the interference.

42. The method of claim 41 wherein deriving the final impairment correlation matrix based on the first and second impairment correlation matrices comprises selecting one of the first and second impairment correlation matrices as the final impairment correlation matrix.

43. The method of claim 41 wherein deriving the final impairment correlation matrix based the first and second impairment correlation matrices comprises combining the first and second impairment correlation matrices.

44. The method of claim 41 wherein estimating the second impairment correlation matrix based on the despread symbols comprises estimating the second impairment correlation matrix based on the first impairment correlation matrix.

45. The method of claim 44 wherein estimating the second impairment correlation matrix based on the first impairment correlation matrix comprises:

generating a whitening matrix based on the first impairment correlation matrix;

generating a whitened error vector based on the whitening matrix; and estimating the second impairment correlation matrix based on the whitened error vector.

46. The method of claim 41 wherein estimating the first impairment correlation matrix based on the despread symbols comprises determining channel estimates based on the despread symbols and estimating a parametric impairment correlation matrix based on the channel estimates.

47. The method of claim 41 wherein estimating the second impairment correlation matrix based on the despread symbols comprises estimating a non-parametric impairment correlation matrix based on the despread symbols.

48. The method of claim 41 wherein the wireless spread spectrum receiver is disposed in at least one of a mobile station and a base station.

49. A method of estimating a signal-to-interference ratio in a wireless spread spectrum receiver comprising:

despreading symbols received over multiple paths of a multi-path channel;

estimating first and second impairment correlation matrices representing at least one impairment based on the despread symbols;

deriving a final impairment correlation matrix for said impairment based on the first and second impairment correlation matrices; and estimating the signal-to-interference ratio based on the final impairment correlation matrix.

50. The method of claim 49 wherein deriving the final impairment correlation matrix based on the first and second impairment correlation matrices comprises selecting one of the first and second impairment correlation matrices as the final impairment correlation matrix.

51. The method of claim 49 wherein deriving the final impairment correlation matrix based the first and second impairment correlation matrices comprises combining the first and second impairment correlation matrices.

52. The method of claim 49 wherein estimating the second impairment correlation matrix based on the despread symbols comprises estimating the second impairment correlation matrix based on the first impairment correlation matrix.

53. The method of claim 52 wherein estimating the second impairment correlation matrix based on the first impairment correlation matrix comprises:

generating a whitening matrix based on the first impairment correlation matrix;

generating a whitened error vector based on the whitening matrix; and estimating the second impairment correlation matrix based on the whitened error vector.

54. The method of claim 49 wherein estimating the first impairment correlation matrix based on the despread symbols comprises determining channel estimates based on the despread symbols and estimating a parametric impairment correlation matrix based on the channel estimates.

55. The method of claim 49 wherein estimating the second impairment correlation matrix based on the despread symbols comprises estimating a non-parametric impairment correlation matrix based on the despread symbols.

56. The method of claim 49 wherein the wireless spread spectrum receiver is disposed in at least one of a mobile station and a base station.

57. A computer readable media containing computer executable instructions for causing a wireless communication device to perform a method comprising estimating a first impairment correlation matrix based on despread symbols received over multiple paths of a multi-path channel;

estimating a second impairment correlation matrix based on the despread symbols; and deriving a final impairment correlation matrix based on the first and second impairment correlation matrices.

58. The computer readable media of claim 57 wherein deriving the final impairment correlation matrix based on the first and second impairment correlation matrices comprises selecting one of the first and second impairment correlation matrices as the final impairment correlation matrix.

59. The computer readable media of claim 57 wherein deriving the final impairment correlation matrix from the first and second impairment correlation matrices comprises combining the first and second impairment correlation matrices.

60. The computer readable media of claim 57 wherein the computer readable media is disposed in at least one of a mobile station and a base station.

* * * * *

UNITED STATES PATENT AND TRADEMARK OFFICE
CERTIFICATE OF CORRECTION

| | | |
|---|---|---|
| PATENT NO. | : 7,536,158 B2 | Page 1 of 1 |
| APPLICATION NO. | : 10/811699 | |
| DATED | : May 19, 2009 | |
| INVENTOR(S) | : Bottomley et al. | |

It is certified that error appears in the above-identified patent and that said Letters Patent is hereby corrected as shown below:

On Title Page 2, in Item (56), under "OTHER PUBLICATIONS", in Column 1, Line 3-4, delete "R. McDonough and A. Whalen, Detection......Academic Press.".

Signed and Sealed this

Seventeenth Day of November, 2009

David J. Kappos
*Director of the United States Patent and Trademark Office*